(12) United States Patent
Groenewolt et al.

(10) Patent No.: US 10,081,738 B2
(45) Date of Patent: *Sep. 25, 2018

(54) MULTICOAT EFFECT AND/OR COLOR PAINT SYSTEM AND METHOD FOR PRODUCING IT, AND ITS USE

(71) Applicant: BASF Coatings GmbH, Münster (DE)

(72) Inventors: Matthijs Groenewolt, Münster (DE); Berthold Austrup, Nordkirchen (DE); Katharina Hübner, Drensteinfurt (DE); Andrea Frank, Billerbeck (DE); Jörg Müller, Hamm (DE)

(73) Assignee: BASF Coatings GmbH, Munich (DE)

( * ) Notice: Subject to any disclaimer, the term of this patent is extended or adjusted under 35 U.S.C. 154(b) by 22 days.

This patent is subject to a terminal disclaimer.

(21) Appl. No.: 14/649,471

(22) PCT Filed: Oct. 18, 2013

(86) PCT No.: PCT/EP2013/071874
§ 371 (c)(1),
(2) Date: Jun. 3, 2015

(87) PCT Pub. No.: WO2014/086529
PCT Pub. Date: Jun. 12, 2014

(65) Prior Publication Data
US 2015/0344728 A1    Dec. 3, 2015

Related U.S. Application Data

(60) Provisional application No. 61/732,420, filed on Dec. 3, 2012.

(30) Foreign Application Priority Data

Dec. 3, 2012  (EP) ..................................... 12195234

(51) Int. Cl.
| | |
|---|---|
| *C09D 175/12* | (2006.01) |
| *C23C 28/00* | (2006.01) |
| *C25D 11/24* | (2006.01) |
| *C23C 26/00* | (2006.01) |
| *C25D 13/12* | (2006.01) |
| *C25D 11/14* | (2006.01) |
| *B05D 5/00* | (2006.01) |
| *C08G 18/62* | (2006.01) |
| *C08G 18/79* | (2006.01) |
| *C08G 18/80* | (2006.01) |
| *B05D 7/00* | (2006.01) |
| *C08K 3/36* | (2006.01) |

(52) U.S. Cl.
CPC ............ *C09D 175/12* (2013.01); *B05D 5/005* (2013.01); *B05D 7/582* (2013.01); *C08G 18/6254* (2013.01); *C08G 18/792* (2013.01); *C08G 18/809* (2013.01); *C23C 26/00* (2013.01); *C23C 28/00* (2013.01); *C25D 11/14* (2013.01); *C25D 11/24* (2013.01); *C25D 13/12* (2013.01); *B05D 7/532* (2013.01); *B05D 2201/02* (2013.01); *B05D 2202/00* (2013.01); *B05D 2401/20* (2013.01); *C08K 3/36* (2013.01); *Y10T 428/259* (2015.01); *Y10T 428/31551* (2015.04)

(58) Field of Classification Search
CPC ......................... C08G 18/6254; C08G 18/792; C08G 18/809; C08K 3/36; C09D 175/12; C23C 26/00; C23C 28/00; C25D 11/14; C25D 11/24; C25D 13/12; Y10T 428/259; Y10T 428/31551; Y10T 428/31583; Y10T 428/31587; Y10T 428/31605; B05D 2201/02; B05D 2202/00; B05D 2401/20; B05D 5/005; B05D 7/532; B05D 7/582
USPC .................... 428/423.1, 424.7, 424.8, 425.8; 427/372.2; 524/506; 106/287.11
See application file for complete search history.

(56) References Cited

U.S. PATENT DOCUMENTS

| | | | |
|---|---|---|---|
| 4,172,822 A | 10/1979 | Patzschke et al. | |
| 4,598,131 A | 7/1986 | Prucnal | |
| 4,710,542 A | 12/1987 | Forgione et al. | |
| 4,780,524 A | 10/1988 | Dobbelstein et al. | |
| 4,826,537 A | 5/1989 | Ostertag et al. | |
| 4,828,826 A | 5/1989 | Franz et al. | |
| 4,840,677 A | 6/1989 | Ostertag | |
| 4,867,795 A | 9/1989 | Ostertag et al. | |
| 4,914,148 A | 4/1990 | Hille et al. | |

(Continued)

FOREIGN PATENT DOCUMENTS

| | | |
|---|---|---|
| DE | 2824418 | 12/1978 |
| DE | 3636183 | 3/1988 |

(Continued)

OTHER PUBLICATIONS

PCT International Preliminary Report on Patentability in PCT/EP2013/071874, dated Jun. 9, 2015, 10 pages.

(Continued)

*Primary Examiner* — Thao T Tran
(74) *Attorney, Agent, or Firm* — Servilla Whitney LLC

(57) ABSTRACT

The present invention relates to a multicoat effect and/or color paint system, a method for producing the multicoat paint system, and also the use thereof. The transparent coating material composition comprises at least one rheological assistant (R) based on fumed silica and comprises a polyisocyanate group-containing component (B) which additionally has at least one structural unit of the formula (I) and/or at least one structural unit of the formula (II).

17 Claims, No Drawings

(56) References Cited

U.S. PATENT DOCUMENTS

| | | |
|---|---|---|
| 5,028,639 A | 7/1991 | Treutlein et al. |
| 5,244,649 A | 9/1993 | Ostertag et al. |
| 5,324,404 A | 6/1994 | Ott et al. |
| 5,368,944 A | 11/1994 | Hartung et al. |
| 6,201,043 B1 | 3/2001 | Bremser et al. |
| 6,274,649 B1 | 8/2001 | Ott et al. |
| 6,492,482 B2 | 12/2002 | Lomoelder et al. |
| 6,632,915 B1 | 10/2003 | Schwarte et al. |
| 8,013,099 B2 | 9/2011 | Poppe et al. |
| 8,152,983 B2 | 4/2012 | Hartung et al. |
| 8,486,539 B2 | 7/2013 | Klein et al. |
| 8,535,795 B2 | 9/2013 | Wegner et al. |
| 8,569,438 B2 | 10/2013 | Groenewolt et al. |
| 8,956,727 B2 | 2/2015 | Poppe et al. |
| 9,017,818 B2 | 4/2015 | Groenewolt et al. |
| 9,018,330 B2 | 4/2015 | Poppe et al. |
| 9,371,469 B2* | 6/2016 | Groenewolt ....... C08G 18/6229 |
| 2003/0027921 A1 | 2/2003 | Speier et al. |
| 2010/0015344 A1* | 1/2010 | Groenewolt ....... C08G 18/289 427/407.1 |
| 2010/0028544 A1* | 2/2010 | Groenewolt ....... C08G 18/289 427/384 |
| 2010/0143596 A1* | 6/2010 | Groenewolt ....... C08G 18/289 427/379 |
| 2011/0027489 A1* | 2/2011 | Groenewolt ....... C08G 18/289 427/387 |
| 2011/0045190 A1* | 2/2011 | Groenewolt ....... C08G 18/1883 427/385.5 |
| 2011/0059251 A1* | 3/2011 | Poppe ................ C08G 18/2063 427/379 |
| 2011/0245406 A1 | 10/2011 | Klein et al. |
| 2011/0274896 A1 | 11/2011 | Krames et al. |
| 2012/0034457 A1* | 2/2012 | Low .................... C09D 133/08 428/336 |
| 2014/0329098 A1* | 11/2014 | Groenewolt ....... C08G 18/289 428/423.1 |
| 2016/0122583 A1* | 5/2016 | Groenewolt ....... C08G 18/6229 428/423.1 |

FOREIGN PATENT DOCUMENTS

| | | |
|---|---|---|
| DE | 3718446 | 12/1988 |
| DE | 3719804 | 3/1989 |
| DE | 3930601 | 3/1991 |
| DE | 3636156 | 4/1998 |
| DE | 102005045228 | 4/2007 |
| DE | 102008060454 | 6/2010 |
| DE | 102009030481 | 1/2011 |
| EP | 0068311 | 1/1983 |
| EP | 0228003 | 7/1987 |
| EP | 0241476 | 10/1987 |
| EP | 0245700 | 11/1987 |
| EP | 0264843 | 4/1988 |
| EP | 0283852 | 9/1988 |
| EP | 0293746 | 12/1988 |
| EP | 0417567 | 3/1991 |
| EP | 0574417 | 12/1993 |
| EP | 0265820 | 5/1998 |
| EP | 0920480 | 6/1999 |
| EP | 0961797 | 12/1999 |
| EP | 0994117 | 4/2000 |
| EP | 1193278 | 4/2002 |
| EP | 1273640 | 1/2003 |
| JP | 2012-511058 | 5/2012 |
| WO | WO-86/07083 | 12/1986 |
| WO | WO-98/07794 | 2/1988 |
| WO | WO-91/09917 | 7/1991 |
| WO | WO-92/15405 | 9/1992 |
| WO | WO-98/33835 | 8/1998 |
| WO | WO-01/09260 | 2/2001 |
| WO | WO-01/25307 | 4/2001 |
| WO | WO-2003/068418 | 8/2003 |
| WO | WO-2004/018580 | 3/2004 |
| WO | WO-2005/003340 | 1/2005 |
| WO | WO-2006/097201 | 9/2006 |
| WO | WO-2007/044769 | 4/2007 |
| WO | WO-2007/137632 | 12/2007 |
| WO | WO-2008/074489 | 6/2008 |
| WO | WO-2010/060523 | 6/2010 |
| WO | WO-2010/063332 | 6/2010 |
| WO | WO-2010/139375 | 12/2010 |
| WO | WO-2012/168014 | 12/2012 |
| WO | WO-2012/168079 | 12/2012 |

OTHER PUBLICATIONS

PCT International Search Report in PCT/EP2013/071874, dated Jan. 16, 2014, 3 pages.

PCT International Written Opinion in PCT/EP2013/071874, dated Jan. 18, 2014, 8 pages.

* cited by examiner

MULTICOAT EFFECT AND/OR COLOR PAINT SYSTEM AND METHOD FOR PRODUCING IT, AND ITS USE

CROSS-REFERENCE TO RELATED APPLICATIONS

This application is the National Stage entry of PCT/EP2013/071874, filed on Oct. 18, 2013, which claims priority to European Application Number 12195234.5, filed on Dec. 3, 2012 and U.S. Provisional Application No. 61/732,420, filed Dec. 3, 2012 which are incorporated herein by reference in their entireties.

FIELD

The present invention relates to a multicoat effect and/or color paint system which is producible by successive application of a first pigmented basecoat coating composition, optionally a second pigmented basecoat coating composition and a transparent coating composition, and joint curing of the basecoat film(s) and of the transparent coating film.

The present invention further provides multistage coating methods for producing the multicoat paint systems, and the use of the multicoat paint systems.

BACKGROUND

Multicoat paint systems used in the automotive OEM finishing sector nowadays consist in general of an electrophoretically applied primer, which provides protection from corrosion and stonechipping, and a subsequent surfacer coat, which provides protection from stonechipping and smoothens the surface. This surfacer coat is usually applied to the already-baked primer, and cured. An alternative possibility is to cure primer and surfacer coat jointly. Applied subsequently to the cured surfacer coat is a single-coat finish or a decorative two-coat finish composed of a color and/or effect basecoat, which is applied in one or more spray passes depending on the particular shade, and of a protective clearcoat, which is applied wet-on-wet to the basecoat. The single-coat finish or the basecoat(s) and the clearcoat is or are then jointly cured.

Increasingly, however, carmakers are concerned to reduce the coat thicknesses of the paint system and also the number of operations and also, where appropriate, the number of coats, without any attendant deterioration in the performance profile of the multicoat paint systems.

Accordingly, multicoat paint systems are known in which one or more basecoats are applied directly to an electrophoretically deposited primer.

Optionally, over the basecoat(s), a clearcoat is applied. Then the basecoat(s) and optionally the clearcoat are jointly cured. With this method, the surfacer coat that is normally situated between cathodic electrocoat and basecoat is omitted.

Thus WO2006/097201 describes a surfacer-less method of this kind for producing a multicoat paint system, in which a first pigmented basecoat film, a second pigmented basecoat film, and a clearcoat film are applied to a baked, cathodically deposited electrocoat primer, and all three coating films are jointly cured. In this case it is essential to the invention to ensure the UV protection of the cathodically deposited electrocoat primer by adding special light stabilizers in the first basecoat film. The clearcoat coating composition used may be any of the commonly used clearcoat materials, such as, for example, the commercial 2K [two-component] polyurethane clearcoat EverGloss® from BASF Coatings GmbH.

WO2010/060523 likewise describes a surfacer-less method in which in place of the surfacer, for the purpose of improving the appearance, particularly in the case of rough substrates, a pigment-free coating material is applied first to the electrocoat primer, before the basecoat films and the concluding clearcoat are applied. As clearcoat coating composition it is possible again to use all commonly employed clearcoat materials, such as, for example, the commercial 2K polyurethane clearcoat EverGloss® from BASF Coatings GmbH.

WO07/044769 discloses a method for producing a multicoat paint system by applying a first primer coating film, a second, pigmented basecoat film, and a clearcoat film, and jointly curing all three coating films. The primer coating film comprises at least one caprolactone-modified, linear acrylate resin, ensuring a good overall appearance to the resultant multicoat finish. As a clearcoat coating composition in the method it is possible to use all known clearcoat coating compositions; the working examples use a 1K [one-component] clearcoat coating composition based on a silanized acrylate resin.

WO2010/139375 describes multicoat paint systems where a conventional basecoat film and a clearcoat film are applied to a baked primer and a baked surfacer coat, and are jointly cured. A feature of the multicoat paint systems is that the clearcoat coating composition, as well as a hydroxyl group-containing compound (A), an isocyanate group-containing compound (B) and an amino resin (C), comprises at least one unsaturated cyclic, sterically hindered amine (D), for preventing the incidence of pops.

Also known from WO2007/137632 are multicoat paint systems where an aqueous basecoat film and a clearcoat film based on a 2K polyurethane coating composition are applied to a baked primer and a baked surfacer coat, and are jointly cured. With the aim of improving window bonding, the 2K polyurethane coating composition comprises an adhesion promoter in the form of a mixture of a phosphonic diester and/or a diphosphonic diester and at least one reaction product of a monoalkoxysilylamine and/or bisalkoxysilylamine with an isocyanurate, though this reaction product no longer has any free isocyanate groups.

Furthermore, WO 10/063332 discloses nonaqueous coating material compositions which comprise at least one polyhydroxyl group-containing compound (A), at least polyisocyanate (B) having free or blocked isocyanate groups and having silane groups, and/or the dimer and/or oligomer thereof, at least one catalyst (D) for the crosslinking of the silane groups, and at least one urea-based rheological assistant (R), and optionally, in addition, a rheological assistant based on fumed silica. For achieving a good overall appearance it is essential to the invention that the polyhydroxyl group-containing compound (A) used in these coating compositions is based on a hyperbranched, dendritic, hydroxyfunctional polyester in which at least one hydroxyl group has been esterified with a C8 to C9 monocarboxylic acid. These coating compositions are applied wet-on-wet to a commercial aqueous basecoat material, and these two coating films are then jointly baked.

The resulting coatings have a high scratch resistance and weathering resistance and also at the same time a good appearance, although even lower short-wave values, as they are known, at increased film thicknesses of at least 40 μm are desirable. Further desirable in these coating compositions is an improvement in the sandability and polishability of the resultant coatings.

Lastly, international patent application PCT/EP 2012/059611, not yet laid open, and international patent application PCT/EP2012/058355, not yet laid open, describe multicoat paint systems where, atop a cured, electrophoretically deposited primer and a cured surfacer coat, a basecoat film and a clearcoat film are applied, it being essential to the invention that the clearcoat coating composition comprises not only a polyhydroxyl group-containing component (A) but also a compound (B) which contains isocyanate groups and silane groups and which more particularly is a mixture of a compound (B1) having a cycloaliphatic polyisocyanate parent structure and of a compound (B2) having an acyclic aliphatic polyisocyanate parent structure. In these applications, the addition of fumed silica-based rheological assistants to the clearcoat coating compositions is no more described than is the use of the clearcoat coating compositions in surfacer-less processes.

DETAILED DESCRIPTION

Problem

The problem addressed by the present invention was therefore that of providing multicoat paint systems of the aforementioned kind which at the same time exhibit a sharply reduced tendency toward blushing under moisture exposure in the constant condensation climate of DIN EN ISO 6270-2 Sep. 2005 and a good overall appearance.

To assess the overall appearance, the surface profile of the applied and baked coating films was measured using the Wavescan method, which allows measurement of the visible profile of paint film surfaces. This was done by measuring the intensity of the reflection ("waviness") using the "Wave Scan" instrument from Byk-Gardner, recording 1250 measurement points over a distance of 10 cm. The instrument divides the reflection into longwave, i.e., the variance in light intensity for structures in the range from 0.6 mm to 10 mm, and into shortwave, i.e., the variance in light intensity of the structures in the range from 0.1 mm to 0.6 mm. The longwave value here is more important when the metal panel is viewed from a distance, while the shortwave value becomes very important when the panel is viewed from close up. For a good appearance, in addition to low longwave values measured on the resultant coatings, at film thicknesses that are as low as possible, it is, in particular, low shortwave measurement values, for a film thickness of approximately 40 µm, that are critical.

A further intention was to provide multicoat effect and/or color paint systems which ensure good polishability.

Furthermore, for the purpose of producing the multicoat effect and/or color paint systems, it ought to be possible to use clearcoat coating compositions which lead to a highly weathering-stable network and at the same time ensure a high acid resistance. Moreover, the coatings and paint systems, especially the clearcoat systems, ought to be able to be produced even in film thicknesses >40 µm without stress cracks occurring.

Furthermore, the multicoat effect and/or color paint systems ought to ensure good window bonding. Good window bonding here means that on mechanical exposure of assemblies comprising at least one multicoat paint system of the aforementioned type, at least one adhesive layer, and at least one window, there is no delamination between substrate and coating, within the coating, or between coating and adhesive layer, but only a cohesive fracture within the adhesive layer.

Over and above these aims, the multicoat effect and/or color paint systems ought to meet the requirements typically imposed on the clearcoat layer in automotive OEM finishes and automotive refinishes.

More particularly, it ought to be possible to produce the multicoat effect and/or color paint systems by means of a surfacer-less process.

Lastly, the new multicoat paint systems ought to be producible easily and with very good reproducibility, and ought not to give rise to any environmental problems during paint application.

Solution to the Problem

In the light of the above statement of problems, a multicoat effect and/or color paint system has been found which is producible by
(I) first electrophoretically depositing a primer coating composition (G) on a substrate and optionally curing it,
(II) applying a first pigmented basecoat coating composition (BL1) to the primer obtained in stage (I),
(III) optionally applying a second pigmented basecoat coating composition (BL2) to the first basecoat film, obtained in stage (II),
(IV) applying a transparent coating material composition (KL) based on at least one polyhydroxyl group-containing compound (A) and at least one polyisocyanate group-containing component (B) to the first basecoat film, obtained in stage (II), or—if a second basecoat coating composition (BL2) has been applied—to the second basecoat film, obtained in stage (III), and
(V) jointly curing the first basecoat film, the second basecoat film, where present, and the transparent coating film, characterized in that the transparent coating material composition (KL) comprises
(i) at least one rheological assistant (R) based on fumed silica and (ii) at least one polyisocyanate group-containing component (B) with at least one structural unit of the formula (I)

and/or with at least one structural unit of the formula (II)

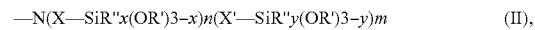

where
R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups,
X,X'=linear and/or branched alkylene or cycloalkylene radical having 1 to 20 carbon atoms,
R"=alkyl, cycloalkyl, aryl or aralkyl, it being possible for the carbon chain to be interrupted by nonadjacent oxygen, sulfur or NRa groups,
n=0 to 2, m=0 to 2, m+n=2, and x, y=0 to 2.

The present invention further provides multistage coating methods for producing the multicoat paint systems, and the use of the multicoat paint systems.

It is surprising and was not foreseeable that the multicoat paint systems of the invention, obtainable by means of a surfacer-less method, at the same time exhibit a strongly reduced tendency toward blushing under moisture exposure in the constant condensation climate of DIN EN ISO 6270-2 Sep. 2005, and a good overall appearance.

A good overall appearance here means in particular that when the surface profile of the applied and baked paint films is measured using the "Wave Scan" instrument from Byk-Gardner, the results, in addition to low longwave measurement values for the resultant coatings, with film thicknesses that are as low as possible, are, in particular, low shortwave measurement values, for a film thickness of approximately 40 μm.

Furthermore, the multicoat effect and/or color paint systems have a good polishability.

Moreover, the transparent coating material compositions used lead to a highly weathering-stable network and at the same time ensure a high acid resistance. Further, it is possible to produce the transparent coatings and paint systems, especially the clearcoat systems, even in film thicknesses >40 μm without stress cracks occurring.

Furthermore, the multicoat effect and/or color paint systems ensure good window bonding. Good window bonding here means that on mechanical exposure of assemblies comprising at least one multicoat paint system of the aforementioned type, at least on adhesive layer, and at least one window, there is no delamination between substrate and coating, within the coating, or between coating and adhesive layer, but only a cohesive fracture within the adhesive layer.

Furthermore, the multicoat effect and/or color paint systems meet the requirements that are typically imposed on the clearcoat film in automotive OEM finishes and automotive refinishes, in the coating of parts for installation in or on vehicles, and in the finishing of utility vehicles.

Lastly, the new multicoat paint systems can be produced easily and with very good reproducibility, and do not give rise to any environmental problems during paint application.

The Transparent Coating Material Compositions Used in Accordance with the Invention The transparent coating compositions used in accordance with the invention are, in particular, thermally curable coating compositions—that is, preferably, coating compositions which are substantially free, and more particularly completely free, from radiation-curable unsaturated compounds. It is particularly preferred here to use clearcoat coating compositions.

The Polyhydroxyl Group-Containing Compound (A)

As polyhydroxyl group-containing compound (A) it is possible to use all compounds known to the skilled person that have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have mass-average molecular weights Mw>500 daltons, measured by means of gel permeation chromatography (GPC) against a polystyrene standard, preferably between 800 and 100 000 daltons, more particularly between 1000 and 50 000 daltons.

Particularly preferred are polyester polyols, polyurethane polyols, polysiloxane polyols, polyacrylate polyols and/or polymethacrylate polyols, and also copolymers thereof, referred to below as polyacrylate polyols.

The polyols preferably have an OH number of 30 to 400 mg KOH/g, more particularly between 100 and 300 KOH/g. The hydroxyl number (OH number) indicates the number of mg of potassium hydroxide that are equivalent to the amount of acetic acid bound by 1 g of substance on acetylation. For the determination, the sample is boiled with acetic anhydride-pyridine and the resultant acid is titrated with potassium hydroxide solution (DIN 53240-2). In the case of pure poly(meth)acrylates, the OH number can also be determined with sufficient precision by calculation on the basis of the OH-functional monomers used.

The glass transition temperatures, measured by means of DSC measurements in accordance with DIN EN ISO 11357-2, of the polyols are preferably between −150 and 100° C., more preferably between −120° C. and 80° C.

Suitable polyester polyols are described for example in EP-A-0 994 117 and EP-A-1 273 640. Polyurethane polyols are prepared preferably by reaction of polyester polyol prepolymers with suitable di- or polyisocyanates and are described for example in EP-A-1 273 640. Suitable polysiloxane polyols are described for example in WO-A-01/09260, the polysiloxane polyols recited therein being useful preferably in combination with other polyols, more particularly those having relatively high glass transition temperatures.

With very particular preference component (A) comprises one or more polyacrylate polyols and/or polymethacrylate polyols. Together with the polyacrylate polyol(s) and/or polymethacrylate polyol(s) it is possible to use other oligomeric and/or polymeric polyhydroxyl group-containing compounds, examples being polyester polyols, polyurethane polyols and polysiloxane polyols, especially polyester polyols.

The poly(meth)acrylate polyols that are especially preferred in accordance with the invention are generally copolymers and preferably have mass-average molecular weights Mw between 1000 and 20 000 daltons, more particularly between 1500 and 10 000 daltons, measured in each case by means of gel permeation chromatography (GPC) against a polystyrene standard.

The glass transition temperature of the copolymers is generally between −100 and 100° C., more particularly between −60 and <20° C. (measured by means of DSC measurements in accordance with DIN EN ISO 11357-2).

The poly(meth)acrylate polyols preferably have an OH number of 60 to 300 mg KOH/g, more particularly between 70 and 200 mg KOH/g, and an acid number of between 0 and 30 mg KOH/g.

The hydroxyl number (OH number) is determined as described above (DIN 53240-2). The acid number here indicates the number of mg of potassium hydroxide that are consumed in the neutralization of 1 g of the respective compound (DIN EN ISO 2114).

As monomer units containing hydroxy groups it is preferred to use hydroxyalkyl acrylates and/or hydroxyalkyl methacrylates, such as, in particular, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also, in particular, 4-hydroxybutyl acrylate and/or 4-hydroxybutyl methacrylate.

As further monomer units it is preferred, for the poly (meth)acrylate polyols, to use alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

As further monomer units for the poly(meth)acrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

Hydroxyl Group-Containing Compounds (C)

Optionally, apart from the polyhydroxyl group-containing component (A), the coating material compositions used in accordance with the invention may further comprise one or more monomeric, hydroxyl group-containing compounds (C), which are different from component (A). Preferably these compounds (C) account for a fraction of 0 to 20 wt %, more preferably from 0 to 10 wt %, very preferably from 1 to 5 wt %, based in each case on the binder fraction of the coating material composition.

Low molecular mass polyols are used as hydroxyl group-containing compound (C).

Low molecular mass polyols used are, for example, diols, such as, preferably, ethylene glycol, neopentyl glycol, 1,2-propanediol, 2,2,-dimethyl-1,3-propanediol, 1,4-butanediol, 1,3-butanediol, 1,5,-pentanediol, 2,2,4-trimethyl-1,3-pentanediol, 1,6-hexanediol, 1,4-cyclohexanedimethanol and 1,2-cyclohexanedimethanol, and also polyols, such as preferably trimethylolethane, trimethylolpropane, trimethylolhexane, 1,2,4-butanetriol, pentaerythritol, and dipentaerythritol. It is preferred to admix such low molecular mass polyols in minor fractions to the polyol component (A).

The Polyisocyanate Group-Containing Component (B)

It is essential to the invention that the transparent coating material composition comprises a polyisocyanate group-containing component (B) which further comprises at least one structural unit (I) of the formula (I)

—NR—(X—SiR"x(OR')3-x)    (I), and/or at least one structural unit of the formula (II)

—N(X—SiR"x(OR')3-x)n(X'—SiR"y(OR')3-y)m    (II), where
R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X,X'=linear and/or branched alkylene or cycloalkylene radical having 1 to 20 carbon atoms, preferably X,X'=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms,
n=0 to 2, m=0 to 2, m+n=2, and x, y=0 to 2.

In the polyisocyanate group-containing component (B), preferably, between 10 and 80 mol %, preferably between 20 and 70 mol %, more preferably between 25 and less than 50 mol % and very preferably between 31 and 45 mol % of the isocyanate groups originally present in the polyisocyanate group-containing component (B) have undergone reaction to form structural units (I) and/or (II), preferably to form structural units (I) and (II).

Moreover, preference is given to polyisocyanate group-containing components (B) in which the total amount of structural units (I) is between 3 and 90 mol %, more preferably between 5 and 70 mol %, based in each case on the entirety of the structural units (I) plus (II), and the total amount of structural units (II) is between 97 and 10 mol %, more preferably between 95 and 30 mol %, based in each case on the entirety of the structural units (I) plus (II).

The di- and/or polyisocyanates which serve as parent structures for the polyisocyanate group-containing component (B) that is used are preferably substituted or unsubstituted aromatic, aliphatic, cycloaliphatic and/or heterocyclic polyisocyanates which are known per se.

Preference is given to using as polyisocyanate group-containing component (B)
(B1) at least one polyisocyanate group-containing compound (B1) having free or blocked isocyanate groups and having a cycloaliphatic polyisocyanate parent structure and/or a polyisocyanate parent structure having free or blocked isocyanate groups that is derived from such a cycloaliphatic polyisocyanate by trimerization, dimerization, urethane formation, biuret formation, uretdione formation and/or allophanate formation, and
(B2) at least one polyisocyanate group-containing compound (B2) different from component (B1) and having free or blocked isocyanate groups and having an acyclic, aliphatic polyisocyanate parent structure and/or a polyisocyanate parent structure having free or blocked isocyanate groups that is derived from such an acyclic aliphatic polyisocyanate by trimerization, dimerization, urethane formation, biuret formation, uretdione formation and/or allophanate formation,
wherein component (B1) and/or component (B2) have at least one structural unit of the formula (I)

—NR—(X—SiR"x(OR')3-x)    (I), and/or at least one structural unit of the formula (II)

—N(X—SiR"x(OR')3-x)n(X'—SiR"y(OR')3-y)m    (II), and the substituents each have the definition stated above.

The Acyclic, Aliphatic Polyisocyanate Component (B2)

It is particularly preferred for the transparent coating material compositions to comprise at least one polyisocyanate group-containing compound (B2), which is different from component (B1), contains free or blocked isocyanate groups and has an acyclic, aliphatic polyisocyanate parent structure and/or a polyisocyanate parent structure derived from such an acyclic aliphatic polyisocyanate by trimerization, dimerization, urethane formation, biuret formation, uretdione formation and/or allophanate formation.

The acyclic aliphatic polyisocyanates serving as parent structures for the polyisocyanate group-containing compounds (B2) used in accordance with the invention are preferably substituted or unsubstituted aliphatic polyisocyanates that are known per se. Examples of preferred polyisocyanates (B2) are tetramethylene 1,4-diisocyanate, hexamethylene 1,6-diisocyanate, 2,2,4-trimethylhexane 1,6-diisocyanate, ethylene diisocyanate, dodecane 1,12-diisocyanate, and mixtures of the aforementioned polyisocyanates.

Additionally preferred polyisocyanate parent structures for component (B2) are the polyisocyanates derived from such an acyclic aliphatic polyisocyanate by trimerization, dimerization, urethane formation, biuret formation, uretdione formation and/or allophanate formation, more particularly the biuret dimer and/or the allophanate dimer and/or the isocyanurate trimer. In a further embodiment of the invention, the polyisocyanate parent structures for component (B2) are polyisocyanate prepolymers having urethane structural units which are obtained by reaction of polyols with a stoichiometric excess of aforementioned acyclic aliphatic polyisocyanates. Polyisocyanate prepolymers of this kind are described for example in U.S. Pat. No. 4,598,131.

Particularly preferred polyisocyanate parent structures for component (B2) are hexamethylene diisocyanate and/or its biuret dimer and/or allophanate dimer and/or isocyanurate trimer and/or its uretdione, and also mixtures of the stated polyisocyanate parent structures.

Especially preferred polyisocyanate parent structures for component (B2) are hexamethylene diisocyanate and/or its isocyanurate trimer, optionally together with its uretdione.

The acyclic aliphatic polyisocyanates used as component (B2), and/or their polyisocyanates derived by trimerization, dimerization, urethane formation, biuret formation, uretdione formation and/or allophanate formation, may further comprise at least one structural unit (I) of the formula (I)

—NR—(X—SiR''$_x$(OR')$_{3-x}$)  (I), and/or at least one structural unit of the formula (II)

—N(X—SiR''$_x$(OR')$_{3-x}$)$_n$(X'—SiR''$_y$(OR')$_{3-y}$)$_m$  (II),

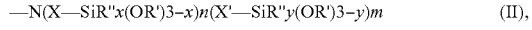

where
R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X,X'=linear and/or branched alkylene or cycloalkylene radical having 1 to 20 carbon atoms, preferably X,X'=alkylene radical having 1 to 4 carbon atoms,
R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R''=alkyl radical, more particularly having 1 to 6 C atoms,
n=0 to 2, m=0 to 2, m+n=2, and x, y=0 to 2.

As component (B2) it is preferred to use acyclic aliphatic polyisocyanates having free or blocked isocyanate groups, and/or their polyisocyanates derived by trimerization, dimerization, urethane formation, biuret formation and/or allophanate formation and having free or blocked isocyanate groups, and having at least one structural unit (I) of the formula (I) and at least one structural unit of the formula (II).

The respective preferred alkoxy radicals (OR') may be identical or different, but what is decisive for the structure of the radicals is the extent to which they influence the reactivity of the hydrolysable silane groups. Preferably R' is an alkyl radical, more particularly having 1 to 6 C atoms. Particularly preferred are radicals R' which increase the reactivity of the silane groups, i.e. represent good leaving groups. Accordingly a methoxy radical is preferred over an ethoxy radical, which in turn is preferred over a propoxy radical. With particular preference, therefore, R'=ethyl and/or methyl, more particularly methyl.

The reactivity of organofunctional silanes may also be influenced considerably, furthermore, by the lengths of the spacers X, X'' between silane functionality and organic functional group which serves for reaction with the constituent to be modified. Examples thereof that may be mentioned include the "alpha" silanes, which are obtainable from the company Wacker, and in which there is a methylene group, instead of the propylene group present in the case of "gamma" silanes, between Si atom and functional group.

The components (B2) used with preference in accordance with the invention and functionalized with the structural units (I) and/or (II) are obtained in particular by reaction of acyclic aliphatic polyisocyanates and/or the polyisocyanates derived therefrom by trimerization, dimerization, urethane formation, biuret formation, uretdione formation and/or allophanate formation, with at least one compound of the formula (Ia)

H—NR—(X—SiR''$_x$(OR')$_{3-x}$)  (Ia), and/or with at least one compound of the formula (IIa)

HN(X—SiR''$_x$(OR')$_{3-x}$)$_n$(X'—SiR''$_y$(OR')$_{3-y}$)$_m$  (IIa),

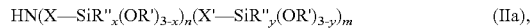

where the substituents have the definition stated above.

The components (B2) that are used with particular preference in accordance with the invention and are functionalized with the structural units (I) and (II) are more preferably obtained by reaction of
acyclic aliphatic polyisocyanates and/or their polyisocyanates derived by trimerization, dimerization, urethane formation, biuret formation, uretdione formation and/or allophanate formation
with at least one compound of the formula (Ia) and with at least one compound of the formula (IIa)
where the substituents have the definition stated above.

Preferred compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. Especially preferred is bis(3-propyltrimethoxy-silyl)amine. Aminosilanes of these kinds are available for example under the brand name DYNASYLAN® from DEGUSSA or Silquest® from OSI.

Preferred compounds (Ia) are aminoalkyltrialkoxysilanes, such as, preferably, 2-aminoethyltrimethoxysilane, 2-aminoethyltriethoxysilane, 3-aminopropyltrimethoxysilane, 3-aminopropyltriethoxysilane, 4-amino-butyltrimethoxysilane, 4-aminobutyltriethoxysilane. Particularly preferred compounds (Ia) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)propyl)alkylamines and/or N-(4-(triethoxysilyl)butyl)alkylamines. Especially preferred is N-(3-(trimethoxysilyl)propyl)butylamine. Aminosilanes of these kinds are available for example under the brand name DYNASYLAN® from DEGUSSA or Silquest® from OSI.

Preferably, in component (B2), between 10 and 90 mol %, more preferably between 20 and 80 mol % and very preferably between 30 and 70 mol % of the isocyanate groups originally present have undergone reaction to form structural units (I) and/or (II), preferably to form structural units (I) and (II).

The Cycloaliphatic Polyisocyanate Component (B1)

It is further particularly preferred for the transparent coating material compositions to comprise at least one polyisocyanate group-containing compound (B1) having free or blocked isocyanate groups and having a cycloaliphatic polyisocyanate parent structure and/or a polyisocyanate parent structure derived from such a cycloaliphatic polyisocyanate by trimerization, dimerization, urethane formation, biuret formation, uretdione formation and/or allophanate formation.

The cycloaliphatic polyisocyanates used as parent structures for the polyisocyanate group-containing compounds (B1) used in accordance with the invention are preferably substituted or unsubstituted cycloaliphatic polyisocyanates which are known per se. Examples of preferred polyisocyanates (B1) are isophorone diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylendicyclohexyl diisocyanate (e.g. Desmodur® W from Bayer AG) and mixtures of the aforementioned polyisocyanates.

Additionally preferred polyisocyanate parent structures for component (B1) are the polyisocyanates derived from such a cycloaliphatic polyisocyanate by trimerization, dimerization, urethane formation, biuret formation, uretdione formation and/or allophanate formation, more particularly the biuret dimer and/or the allophanate dimer and/or the isocyanurate trimer.

In another embodiment of the invention, the polyisocyanate parent structures for component (B1) are polyisocyanate prepolymers having urethane structural units which are obtained by reaction of polyols with a stoichiometric excess of aforementioned cycloaliphatic polyisocyanates. Such polyisocyanate prepolymers are described for example in U.S. Pat. No. 4,598,131.

Particularly preferred cycloaliphatic polyisocyanates (B1) are isophorone diisocyanate and 4,4'-methylenedicyclohexyl diisocyanate and/or the biuret dimers thereof and/or the allophanate dimers thereof and/or the isocyanurate trimers thereof.

The cycloaliphatic polyisocyanates used as component (B1), and their polyisocyanates derived by trimerization, dimerization, urethane formation, biuret formation, uretdione formation and/or allophanate formation, may further comprise at least one structural unit (I) of the formula (I) and/or at least one structural unit of the formula (II).

The components (B1) functionalized with the structural units (I) and/or (II) are preferably obtained by reaction of cycloaliphatic polyisocyanates and/or of their polyisocyanates derived by trimerization, dimerization, urethane formation, biuret formation, uretdione formation and/or allophanate formation with at least one compound of the formula (Ia)

$$\text{H—NR—(X—SiR''}_x\text{(OR)}_{3-x}) \quad \text{(Ia)},$$

and/or with at least one compound of the formula (IIa)

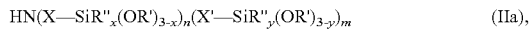

$$\text{HN(X—SiR''}_x\text{(OR)}_{3-x})_n(\text{X'—SiR''}_y\text{(OR')}_{3-y})_m \quad \text{(IIa)},$$

wherein the substituents have the definition stated above.

Preferably in component (B1) 0 to 34 mol %, preferably less than 5.0 mol %, more preferably less than 2.5 mol %, and very preferably none of the isocyanate groups originally present have undergone reaction to form structural units (I) and/or to form structural units (II).

It is also particularly preferred for the mixture of components (B1) plus (B2) to contain not only structural units (I) but also structural units (II). If, therefore, component (B1) contains only structural units (I), but no structural units (II), then component (B2) necessarily includes structural units (II) and also, optionally, structural units (I) as well. If component (B1) contains only structural units (II), but no structural units (I), then component (B2) necessarily includes structural units (I) and also, optionally, structural units (II) as well.

If, therefore, component (B2) contains only structural units (I), but no structural units (II), then component (B1) necessarily includes structural units (II) and also, optionally, structural units (I) as well. If component (B2) contains only structural units (II), but no structural units (I), then component (B1) necessarily includes structural units (I) and also, optionally, structural units (II) as well.

Preferred coating material compositions are obtained if the total amount of structural units (I) in the mixture of component (B1) plus component (B2) is between 3 and 90 mol %, preferably between 5 and 70 mol %, more preferably between 10 and 50 mol %, very preferably between 10 and 40 mol %, based in each case on the entirety of the structural units (I) plus (II), and the total amount of the structural units (II) in the mixture of component (B1) plus component (B2) is between 97 and 10 mol %, preferably between 95 and 30 mol %, more preferably between 90 and 50 mol % and very preferably between 90 and 60 mol %, based in each case on the entirety of the structural units (I) plus (II).

In the mixture of the polyisocyanate component (B1) plus the polyisocyanate component (B2), preferably, between 10 and 80 mol %, preferably between 20 and 70 mol %, more preferably between 25 and less than 50 mol % and very preferably between 31 and 45 mol % of the isocyanate groups originally present in (B1) plus (B2) have undergone reaction to form structural units (I) and/or (II), preferably to form structural units (I) and (II).

Component (B1) is used preferably in an amount such that the binder fraction of the isocyanate group-containing parent structure of component (B1) is between 5 and 45 wt %, preferably between 10 and 40 wt % and more preferably between 15 and 35 wt %, based in each case on the sum of the binder fraction of the isocyanate group-containing parent structure of component (B1) plus the binder fraction of the isocyanate group-containing parent structure of component (B2).

Coating material compositions used with particular preference are obtained if in the mixture of component (B1) plus component (B2) the total amount of structural units (I) is between 10 and 50 mol % and the total amount of structural units (II) is between 90 and 50 mol %, based in each case on the entirety of the structural units (I) plus (II), and between 25 and less than 50 mol % of the isocyanate groups originally present in (B1) plus (B2) have undergone reaction to form structural units (I) and (II)

and component (B1) is used in an amount such that the binder fraction of the isocyanate group-containing parent structure of component (B1) is between 15 and 35 wt %, based in each case on the sum of the binder fraction of the isocyanate group-containing parent structure of component (B1) plus the binder fraction of the isocyanate group-containing parent structure of component (B2).

In another embodiment of the invention the polyhydroxyl group-containing compound (A), as well as the hydroxyl groups, has structural units of the formula (I) and/or of the formula (II).

Structural units of the formula (I) can be introduced into the compound (A) by incorporation of monomer units having such structural units or by reaction of polyols which contain further functional groups with a compound of the formula (Ia), the substituents having the above-stated definition. Structural units of the formula (II) can be introduced analogously into the compound (A) by incorporation of monomer units having such structural units or by reaction of polyols containing further functional groups with a compound of the formula (IIa), the substituents having the above-stated definition. For reaction of the polyol with the compound (Ia) and/or (IIa), said polyol, accordingly, has other functional groups which react with the secondary amino group of the compound (Ia) or (IIa), respectively, such as acid groups or epoxy groups more particularly.

Monomer units which carry the structural elements (I) and/or (II) are preferably reaction products of acrylic and/or methacrylic acid or of epoxy group-containing alkyl acrylates and/or alkyl methacrylates with the abovementioned compounds (Ia) and/or (IIa).

Suitable polyhydroxyl group-containing compounds (A) having structural units of the formula (I) and/or of the formula (II) are also described in WO 08/74489, page 21, line 21, to page 23, line 18.

Catalyst (D)

The transparent coating material compositions used in accordance with the invention preferably comprise at least one catalyst (D) for the crosslinking of the silane groups. Examples are metal complexes with chelate ligands based on zinc or aluminum, such as Lewis acids or the titanates described in WO05/03340, for example, but when selecting the catalysts it should be ensured that they do not result in any yellowing of the coating material compositions. Moreover, some catalysts whose use is known are less desirable on toxicological grounds.

It is therefore preferred for phosphorus-containing, more particularly phosphorus-containing and nitrogen-containing, catalysts to be used as catalyst (D). In this context it is also possible to use mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of these kinds are described for example in German patent application DE-A-102005045228.

More particularly, however, use is made of substituted phosphoric monoesters and phosphoric diesters, preferably from the group consisting of acyclic phosphoric diesters and cyclic phosphoric diesters, more preferably amine adducts of phosphoric monoesters and diesters.

Used with very particular preference as catalyst (D) are the corresponding amine-blocked phosphoric esters, and, of these, more particularly, amine-blocked ethylhexyl phosphates and amine-blocked phenyl phosphates, very preferably amine-blocked bis(2-ethylhexyl)phosphate.

Examples of amines with which the phosphoric esters are blocked are, in particular, tertiary amines, examples being bicyclic amines, such as diazabicyclooctane (DABCO), diazabicyclononene (DBN), diazabicycloundecene (DBU), dimethyldodecylamine or triethylamine, for example. Particularly preferred for blocking the phosphoric esters is the use of tertiary amines which ensure high activity of the catalyst under the curing conditions.

Certain amine-blocked phosphoric acid catalysts are also available commercially (e.g. Nacure types from King Industries). For example, Nacure 4167 from King Industries may be mentioned as a particularly suitable catalyst based on an amine-blocked phosphoric acid partial ester.

The catalysts are used preferably in fractions of 0.01 to 20 wt %, more preferably in fractions of 0.1 to 10 wt %, based on the binder fraction of the coating material composition of the invention. A lower catalyst activity can be partially compensated by using amounts that are correspondingly higher.

The transparent coating material compositions used in accordance with the invention may further comprise another amine catalyst based on a bicyclic amine, more particularly on an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are used preferably in fractions of 0.01 to 20 wt %, more preferably in fractions of 0.1 to 10 wt %, based on the binder fraction of the coating material composition of the invention.

The Rheological Assistant (R) Based on Fumed Silica

It is essential to the invention that the transparent coating material composition used in accordance with the invention comprises at least one rheological assistant (R) based on fumed silica.

The rheological assistants (R) based on fumed silica generally have a catenary structure and are agglomerates or aggregates of primary particles of silicon dioxide. These rheological assistants are obtained more particularly by flame hydrolysis of silicon halogen compounds. Rheological assistants of these kinds are available commercially for example under the name Aerosil® from Evonik Degussa.

As the skilled person is aware, suitable reaction conditions for the flame hydrolysis and surface modifications to the primary silicon dioxide particles can be used to tailor the parameters and hence also the properties of the fumed silica particles.

A relevant parameter, for example, is the primary particle size of the silicon dioxide particles, since generally there is a reduction in the tendency toward agglomeration as the primary particle size goes up. Moreover, of course, a small primary particle size implies a high specific surface area.

Furthermore, a distinction is made in particular between rheological assistants (R1) based on hydrophilic silicas and rheological assistants (R2) based on hydrophobic silicas. Generally speaking, rheological assistants (R1) based on hydrophilic silicas have a greater effect on the rheology of the coating material composition.

In accordance with the invention it is possible as rheological assistant (R) to use either at least one rheological assistant (R1) based on hydrophilic silicas or at least one rheological assistant (R2) based on hydrophobic silicas, or a mixture of at least one rheological assistant (R1) based on hydrophilic silicas and at least one rheological assistant (R2) based on hydrophobic silicas.

On its surface, the fumed silica produced by means of flame hydrolysis has various functional groups, more particularly silanol groups and siloxane groups. It is therefore hydrophilic per se and can be used without further modification to its surface as a rheological assistant (R1)—accordingly, these rheological assistants (R1) consist preferably of fumed silica.

In the coating compositions it is also possible to use fumed silicas whose surface has been modified with monomeric or oligomeric compounds. Surface modification is typically accomplished by attachment of the groups present on the silica surface, such as silanol groups, for example, to monomeric or oligomeric compounds. These monomeric or oligomeric compounds therefore contain at least one group with affinity for the groups that are located on the particle surface. The attachment can be accomplished by means for example of covalent bonding, ionic attachment or physisorption. That part of the monomeric or oligomeric compounds that is not needed for attachment to the silica particle surface preferably protrudes wholly or partly into the medium surrounding the particles.

In addition to the group that is needed for attachment to the surface of the silica particles, the monomeric or oligomeric compounds used for surface modification may further comprise other functional groups, with the capability, for example, of reacting with the binder component (A). A surface modification of this kind is achieved for example by addition of hydrolysable silanes, additionally carrying at least one further functional group, to the silica particles.

Examples of hydrolysable silanes suitable for the surface modification of the particles include those silanes which as a group reactive toward the binder (A) and/or the crosslinking agents (B1) and/or (B2) contain a glycidyl group, an amino group, a hydroxyl group or a mercapto group.

For surface modification in accordance with the invention it is nevertheless preferred to use monomeric or oligomeric compounds which as well as the group that is reactive toward silanol groups also have one or more hydrophobic radicals and so are associated with hydrophobizing of the silica particles, and therefore serve to produce the rheological assistants (R2) based on hydrophobic silicas. For modifying the silica it is preferred to use organo-functional silicon compounds having at least one alkyl group with 1 to 50 C atoms, more particularly with 1 to 10 C atoms, and having at least one hydrolysable group and/or having at least one OH and/or NH group. Examples of such compounds are alkylalkoxysilanes, more particularly dialkyldialkoxysilanes and alkyltrialkoxysilanes, alkylhalosilanes, more particularly alkylchlorosilanes, preferably trialkylchlorosilanes and dialkyldichlorosilanes, alkylpolysiloxanes, dialkylpolysiloxanes and alkyldisilazanes and the like.

As rheological assistants (R2) based on hydrophobic silicas it is particularly preferred here to use silanized, pyrogenically prepared silicas which on the surface have fixed trimethylsilyl groups and/or dimethylsilyl groups and/or monomethylsilyl groups. These rheological assistants (R2) used with particular preference may be prepared, for example, by subjecting a pyrogenically prepared silicon dioxide to surface modification with trimethylchlorosilane and/or dimethyldichlorosilane and/or monomethyltrichlorosilane.

In principle there is an increase in the rheology control effect both of the rheological assistants (R1) based on hydrophilic silica and of the rheological assistants (R2) based on hydrophobic silica as the primary particle size goes down. Not only the rheological assistants (R1) based on hydrophilic silicas and used in accordance with the invention, but also the rheological assistants (R2) based on hydrophobic silicas, therefore typically have a primary particle size of <50 nm.

In the transparent coating material compositions it is therefore preferred to use not only rheological assistants (R1) based on hydrophilic silica but also rheological assistants (R2) based on hydrophobic silica having a BET internal surface area of more than 100 $m^2/g$, more particularly having a BET internal surface area of more than 200 $m^2/g$.

Examples of suitable rheological assistants (R1) based on hydrophilic silicas are also the commercially available products which are customary and known and which are sold for example by Degussa Evonik under the brand name Aerosil® 380, Aerosil® 300, Aerosil® 200, Aerosil® 150 and Aerosil® 130 or by Wacker under the type designation T 40, with Aerosil® 380 being used in particular.

Examples of rheological assistants (R2) based on hydrophobic silicas are customary and known products, as sold for example by Degussa Evonik under the brand name Aerosil®, more particularly Aerosil® R816, R711, 8200, R106, R972, R974, R805, R812 or R812S, or by Wacker under the brand name or type designation HDK, more particularly HDK H 15, H 18, H 20, H 30 or 2000.

In the coating material compositions the rheological assistants (R), or (R1) and/or (R2), are used preferably in at least part of the binder (A) or, if two or more different binders (A) are used in the coating material compositions of the invention, in at least part of at least one binder (A), in dispersion.

The rheological assistant (R) is used preferably in fractions of 0.01 to 10 wt %, more preferably in fractions of 0.5 to 5.0 wt %, based on the binder fraction of the coating material composition of the invention. Where two or more different rheological assistants (R) are used, the total amount of all of these rheological assistants (R) is between 0.01 and 10 wt %, more preferably between 0.5 and 5.0 wt %, based on the binder fraction of the coating material composition of the invention. Where the rheological assistant (R) used comprises a mixture of at least one rheological assistant (R1) based on hydrophilic silicas and at least one rheological assistant (R2) based on hydrophobic silicas, the total amount of these rheological assistants (R1) plus (R2) is between 0.01 and 10 wt %, more preferably between 0.05 and 5.0 wt %, based on the binder fraction of the coating material composition of the invention.

The Combination of Components (A), (B1), (B2), Optionally (C), (D) and (R), and Also Further Components of the Transparent Coating Material Compositions Where the compositions are one-component coating material compositions, polyisocyanate group-containing compounds (B1) and (B2) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. It is particularly preferred to carry out blocking of the isocyanate groups of components (B1) and (B2) with 3,5-dimethylpyrazole.

In the case of the two-component (2K) coating material compositions that are particularly preferred in accordance with the invention, a coatings component comprising the polyhydroxyl group-containing compound (A) and also further components, described below, is mixed shortly before the application of the coating material with a further coatings component, comprising the polyisocyanate group-containing compounds (B1) and (B2) and also, optionally, other of the components described below, mixing taking place in a manner known per se; in general, the coatings component which comprises the compound (A) comprises the catalyst (D) and also a part of the solvent.

The polyhydroxyl group-containing component (A) may be present in a suitable solvent. Suitable solvents are those which allow sufficient solubility of the polyhydroxyl group-containing component.

It is preferred in accordance with the invention to use coating material compositions which comprise from 20 to 79.98 wt %, preferably from 30 to 69.4 wt %, based in each case on the binder fraction of the coating material composition, of at least one polyhydroxyl group-containing compound (A), more particularly at least one polyhydroxyl group-containing polyacrylate (A) and/or at least one polyhydroxyl group-containing polymethacrylate (A).

In accordance with the invention it is preferred to use coating material compositions which contain from 79.98 to 20 wt %, preferably from 69.4 to 30 wt %, based in each case on the binder fraction of the coating material composition, of the mixture of at least one polyisocyanate component (B1) plus at least one polyisocyanate component (B2).

The coating material compositions preferably comprise the compounds (C) in a fraction of 0 to 20 wt %, more preferably of 0 to 10 wt %, very preferably of 1 to 5 wt %, based in each case on the binder fraction of the coating material composition.

The weight fractions of the polyol (A) and optionally (C) and of the polyisocyanates (B1) and (B2) are preferably selected such that the molar equivalents ratio of the hydroxyl groups of the polyhydroxyl group-containing compound (A) plus optionally (C) to the isocyanate groups of components (B1) plus (B2) is between 1:0.5 and 1:1.5, preferably between 1:0.8 and 1:1.2, more preferably between 1:0.9 and 1:1.1.

The polyhydroxyl group-containing component (A), the polyhydroxyl component (C) and/or the polyisocyanate component (B1) and/or (B2) may be present in a suitable solvent.

Suitable solvents (L) for the coating material compositions of the invention are more particularly those which in the coating composition are chemically inert toward the compounds (A), (B1), (B2) and optionally (C) and which also do not react with (A), optionally (C), (B1) and (B2) in the course of the curing of the coating composition. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1 wt %, more preferably not more than 0.5 wt %, based on the solvent.

The solvent or solvents are used in the coating material compositions of the invention preferably in an amount such that the binder content of the coating material composition is at least 50 wt %, more preferably at least 60 wt %. Here it must be borne in mind that in general the viscosity of the coating material composition goes up as the solids content increases, and the leveling of the coating material composition and hence the overall appearance of the cured coating become poorer as the solids content increases.

As well as the compounds (A), (B1), (B2) and optionally (C) it is also possible to use further binders (E) which are able to react preferably with the hydroxyl groups of the poly(meth)acrylate (A) and/or with the free isocyanate groups of the compound (B) and/or with the alkoxysilyl groups of the compounds (B) and to form network nodes.

As component (E) it is possible, for example, to use amino resins and/or epoxy resins. The customary and known amino resins are contemplated, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207.

Generally speaking, components (E) of this kind are used in fractions of up to 40 wt %, preferably of up to 30 wt %, more preferably of up to 25 wt %, based on the binder fraction of the coating material composition of the invention.

The coating material composition of the invention further comprises the rheological assistant (R) in a total amount of 0.01 to 10 wt %, more preferably in a total amount of 0.5 to 5.0 wt %, based on the binder fraction of the coating material composition of the invention.

The binder mixture of the invention or the coating material composition of the invention may further comprise at least one customary and known coatings additive (F), different from components (A), (B), (C), (D) and (R), in effective amounts, i.e., in amounts preferably of up to 30 wt %, more preferably of up to 20 wt % and more particularly up to 10 wt %, based in each case on the binder fraction of the coating material composition.

Examples of suitable coatings additives (F) are as follows:
especially UV absorbers;
especially light stabilizers such as HALS compounds, benzotriazoles or oxalanilides;
radical scavengers;
slip additives;
polymerization inhibitors;
defoamers;
reactive diluents different from components (A) and (C), more particularly reactive diluents which become reactive only through reaction with other constituents and/or water, such as Incozol or aspartic esters, for example;
wetting agents different from components (A) and (C), such as siloxanes, compounds containing fluorine, carboxylic monoesters, phosphoric esters, polyacrylic acids and their copolymers, or polyurethanes;
adhesion promoters;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben", Georg Thieme Verlag, Stuttgart, 1998, pages 250 to 252;
flame retardants.

Preferred in this context are coating material compositions which contain less than 7.5 wt %, preferably less than 5.0 wt %, more preferably less than 1.0 wt %, based in each case on the binder fraction of the coating material composition of the invention and based on the binder fraction of the urea-based rheological assistant, and more particularly none at all, of urea-based rheological assistants.

Particularly preferred are coating material compositions which comprise 30 to 69.4 wt %, based on the binder fraction of the coating material composition, of at least one polyhydroxyl group-containing polyacrylate (A) and/or of at least one polyhydroxyl group-containing polymethacrylate (A), 69.4 to 30 wt %, based on the binder fraction of the coating material composition, of the polyisocyanate group-containing compounds (B1) plus (B2), 0 to 10 wt %, based on the binder fraction of the coating material composition, of the hydroxyl group-containing component (C)

0.1 to 10 wt %, based on the binder fraction of the coating material composition of the invention, of at least one catalyst (D), 0.5 to 5 wt %, based on the binder fraction of the coating material composition of the invention, of at least one rheological assistant (R) based on fumed silica, 0 to 15 wt %, based on the binder fraction of the coating material composition, of one or more amino resins and/or of one or more tris(alkoxycarbonylamino)triazines (E), and 0 to 20 wt %, based on the binder fraction of the coating material composition, of at least one customary and known coatings additive (F).

The binder fraction of the coating material composition is determined prior to crosslinking by weighing out a small sample (P) of the coating material composition and subsequently determining the solids content by drying it at 130° C. for 60 minutes, cooling it and then reweighing it. The residue corresponds to the binder fraction of the sample (P). The binder fraction of the coating material composition in % by weight is then given, correspondingly, by 100 multiplied by the ratio of the weight of the residue of the sample (P) after drying at 130° C., divided by the weight of the sample (P) prior to drying.

The binder fraction of the individual components (A) and (B1) and (B2) and (C), respectively, of the coating material compositions is determined analogously by weighing out a small sample (P) of the respective component (A) or (B1) or (B2) or (C) and subsequently determining the solids content by drying it at 130° C. for 60 minutes, cooling it and then reweighing it. The binder fraction of the component in % by weight is then given, correspondingly, by 100 multiplied by the ratio of the weight of the residue of the respective sample (P) after drying at 130° C., divided by the weight of the respective sample (P) prior to drying.

In a further embodiment of the invention, the binder mixture used in accordance with the invention or the transparent coating material composition used in accordance with the invention may further comprise pigments and/or transparent fillers and may serve for producing pigmented transparent topcoats. The pigments and/or fillers used for these purposes are known to the skilled worker. The pigments are used typically in an amount such that the pigment-to-binder ratio is between 0.05:1 and 1.5:1, based in each case on the binder fraction of the coating material composition.

The Basecoat Coating Compositions (BL1) and (BL2) Comprising Effect and/or Color Pigments The basecoat coating compositions (BL1) and (BL2) comprise at least one pigment. The pigment is preferably selected from the group consisting of organic and inorganic, color-imparting, optical effect-imparting, color- and optical effect-imparting, fluorescent and phosphorescent pigments, more particularly from the group consisting of organic and inorganic, color-imparting, optical effect-imparting, color- and optical effect-imparting pigments.

Examples of suitable effect pigments, which may also impart color, are metal flake pigments, such as commercial aluminum bronzes, aluminum bronzes chromated in accordance with DE 36 36 183 A1, and commercial stainless steel bronzes, and also nonmetallic effect pigments, such as, for example, pearlescent pigments and interference pigments, platelet-shaped effect pigments based on iron oxide with a hue from pink to brownish red, or liquid-crystalline effect pigments. For further details refer to Römpp Lexikon Lacke and Druckfarben, Georg Thieme Verlag, 1998, pages 176, "Effect pigments" and pages 380 and 381, "Metal oxide-mica pigments" to "Metallic pigments", and to patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A or U.S. Pat. No. 5,244,649 A.

Examples of suitable inorganic color pigments are white pigments such as zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases, or chromium orange; or yellow iron oxide, nickel titanium yellow, chromium titanium yellow, cadmium sufide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke and Druckfarben, entry headings pages 180 and 181, "Iron blue pigments" to "Black iron oxide", pages 451 to 453, "Pigments" to "Pigment volume concentration", page 563 "Thioindigo pigments", page 567 "Titanium dioxide pigments", pages 400 and 467, "Naturally occurring pigments", page 459 "Polycyclic pigments", page 52, "Azomethine pigments", "Azo pigments" and page 379, "Metal complex pigments".

Examples of fluorescent and phosphorescent pigments (daylight fluorescent pigments) are bis(azomethine) pigments.

The basecoat coating compositions (BL1) and (BL2) may further comprise functional pigments, such as magnetically shielding, electrically conductive, corrosion-inhibiting, UV radiation-absorbing or stonechip protection pigments.

Examples of magnetically shielding pigments are pigments based on iron oxides or chromium dioxide. Examples of suitable electrically conductive pigments are titanium dioxide/tin oxide pigments. Examples of suitable corrosion-inhibiting pigments are lead silicates, zinc phosphates or zinc borates. An example of a suitable stonechip protection pigment is talc.

The UV radiation-absorbing pigments are preferably selected from the group consisting of titanium dioxide pigments and carbon black pigments. It is preferred to use at least one titanium dioxide pigment and at least one carbon black pigment.

The amount of functional pigments in the basecoat coating compositions (BL1) and (BL2) may vary very widely and is guided by the requirements of the case in hand. The amount of functional pigment, based on the solids (determined as described for the determination of the binder fraction in the case of the transparent coating material composition) of the basecoat coating composition, is preferably 0.001 to 6 wt %, more preferably 0.01 to 5 wt %, more particularly 0.01 to 4 wt %.

The amount of pigments in the basecoat coating composition may vary very widely and is guided primarily by the intensity of the effects, more particularly of the optical effects, and/or the hue, that is or are to be brought about. In the case of solid-color paints, based in each case on the solids (determined as described for determining the binder fraction in the case of the transparent coating material composition) of the basecoat coating composition, the pigment content is preferably 0.5 to 70, more preferably 1.0 to 60 wt %. In the case of metallic paints and effect paints, based in each case on the solids (determined as described for determining the binder fraction in the case of the transparent coating material composition) of the basecoat coating composition, the pigment content is preferably 0.5 to 40, more preferably 0.5 to 35, very preferably 1 to 30 wt %.

With particular preference the first basecoat coating composition (BL1) comprises color pigments and the second basecoat coating composition (BL2) comprises effect pigments.

The basecoat coating compositions (BL1) and (BL2) used in accordance with the invention may have been produced using either aqueous or solventborne coating compositions (B) which in general are curable physically or thermally and/or with actinic radiation. The basecoat coating compositions (BL1) and (BL2) are preferably aqueous basecoat coating compositions.

The basecoat coating compositions (BL1) and (BL2) typically comprise one or more solvents and/or water,
one or more binders, preferably one or more polyurethane resins and/or acrylate resins and/or polyester resins, more preferably at least one polyurethane resin,
optionally at least one crosslinking agent,
one or more pigments,
optionally UV absorbers,
and optionally one or more customary auxiliaries and adjuvants.

Suitable binders here are the polyurethane resins, acrylate resins and polyester resins that are typically employed in basecoats in the automobile industry, the properties and hence the suitability of the binders for the method of the invention being controlled, in a way which the skilled person knows, via the selection of the nature and amount of the synthesis components used in preparing these binders.

Preferably used are polyurethane resins, optionally in combination with one or more polyacrylate resins and/or with one or more polyester resins.

The polyurethane resins are obtained in a manner known to the skilled person by reaction
of at least one polyol, selected from the group consisting of polyester polyols and polyether polyols, preferably with a number-average molecular weight of 400 to 5000, and
of at least one polyisocyanate and also
optionally of at least one compound comprising at least one isocyanate-reactive functional group and at least one (potentially) anionic group in the molecule,
optionally of at least one further compound comprising at least one isocyanate-reactive functional group and optionally of at least one compound with a number-average molecular weight of 60 to 600 daltons, comprising hydroxyl and/or amino groups in the molecule,
and, in the case of the polyurethane resins used for aqueous coating compositions, neutralization of the resultant reaction product. Polyurethane resins of this kind are described for example in EP-B-228 003, EP-B-574 417 and WO2006/097201.

Together with or instead of the stated polyurethane resins, suitability as binders in the pigmented coating compositions is also possessed by so-called acrylated polyurethane resins, which are obtainable in a way which is known to the skilled person, by polymerization of ethylenically unsaturated monomers in the presence of a polyurethane resin. In that case it is possible to use polyurethane resins without double bonds and/or polyurethane resins with double bonds.

Used with particular preference as binders are acrylated polyurethane resins having lateral and/or terminal double bonds, more particularly having lateral and/or terminal ethenylarylene groups. Suitable acrylated polyurethane resins and also graft copolymers prepared from them are described for example in WO01/25307, page 5 line 14 to page 45 line 4, and in EP-B-787 159, page 2 line 27 to page 7 line 13, and also in WO2006/097201, page 27 line 11 to page 28 line 5.

The polyurethane resins described can be used optionally in combination with one or more polyacrylate resins and/or with one or more polyester resins.

The amount of binder in the basecoat coating compositions is generally 10 to 99 wt %, based in each case on the solids content of the coating composition, preferably 30 to 90 wt %.

The amount of crosslinking agent in the basecoat coating compositions is generally 0 to 55 wt %, based in each case on the solids content of the coating composition, preferably 5 to 40 wt %.

As a crosslinking agent, employed optionally, the pigmented coating compositions comprise, in particular, free isocyanates or blocked isocyanates and/or amino resins.

Besides the above-described pigments, the basecoat coating compositions may comprise customary and known auxiliaries and adjuvants, such as organic and inorganic, transparent and hiding fillers, and nanoparticles, and also polymer microparticles and other customary auxiliaries and adjuvants, in customary amounts, preferably 0 to 40 wt %, based on the coating composition.

In the case of a multilayer pigmented coating, the first basecoat film may also comprise further additives in comparison to the subsequent, second basecoat film, these additives being more particularly those for achieving surfacer qualities, such as elastomeric particles, talc and the like, for example.

The Primer Coating Composition (G)

Where the substrates consist of steel and similar metals, customary and known electrocoat systems are used as primers (G). The electrocoat systems (G) are produced in a customary and known way from electrocoat materials which are depositable electrophoretically, more particularly cathodically. The resulting electrocoat films (G) are generally cured before the first basecoat coating composition (BL1) is applied. However, they may also be merely dried, without curing or with only partial curing, after which they are cured together with the remaining films (BL1), optionally (BL2), and (KL).

Where the substrates consist of aluminum, then aluminum oxide layers generated by anodic oxidation are used as primers (G), and as such require no further curing.

Where the substrates consist of plastics, as in the case of parts for installation in or on motor vehicles, for example, they are preferably provided with a customary and known hydro (water-based) primer (G), or the adhesion properties of their surface are enhanced using chemical and/or physical methods. In these cases as well there is generally no need to cure the primers (G).

Where the multicoat paint systems of the invention are used to coat other substrates, the coating materials customary for priming these substrates are employed.

The electrocoat materials comprise binders which carry substituents which are ionic or can be converted into ionic groups, and they also carry groups capable of chemical crosslinking. The ionic groups may be anionic groups or groups convertible into anionic groups, examples being COOH groups, or may be cationic groups or groups convertible into cationic groups, examples being amino, ammonium, quaternary ammonium, phosphonium and/or sulfonium groups. It is preferred to use binders with basic groups, more particularly with basic groups containing nitrogen. These groups may be in quaternized form or they are converted into ionic groups using customary neutralizing agents, such as organic monocarboxylic acids, such as formic, acetic or lactic acid, for example.

Suitable anodically depositable electrocoat materials are known and are described for example in DE-A-28 24 418. They typically comprise self-crosslinking or externally crosslinking binders based on polyesters, epoxy resins, poly(meth)acrylates, maleate oils or polybutadiene oils, which carry anionic groups, such as —COOH, —SO3H and/or —PO3H2 groups, and also customary crosslinkers, such as triazine resins, blocked polyisocyanates, or crosslinkers which carry transesterifiable groups.

Suitable cathodically depositable electrocoat materials are likewise known and are described for example in EP-B 0241476, WO 91/09917, EP-B-0920 480, EP-B 0961 797, WO2003/068418 and WO2004/018580. They typically comprise self-crosslinking or externally crosslinking binders based on polyesters, epoxy resins, epoxy resins having terminal double bonds or OH groups, poly(meth)acrylates, polyurethane resins or polybutadiene resins, which carry cationic groups, such as primary, secondary or tertiary amino groups, which are neutralized with an organic acid, and also customary crosslinkers, such as triazine resins, blocked polyisocyanates, amino resins, polyepoxide compounds, or crosslinkers which carry transesterifiable groups or double bonds.

It is preferred to use the cathodically depositable electrocoat materials which are described in EP-B-0961 797 and which comprise an aqueous binder dispersion based on epoxy resins which contain ammonium groups and are obtainable by
reaction of one or more diepoxy resins (a) with one or more mono- and/or diphenols (b) to give an intermediate (I),
reaction of the intermediate (I) with one or more amines to give an epoxide-amine adduct (A),
subsequent or simultaneous reaction of the secondary hydroxyl groups formed in the reaction of (a) and (b) with the epoxide groups of the epoxide-amine adduct (A),
addition of at least one crosslinking agent,
neutralization and
dispersing of the resultant mixture in water.

The Production of the Multicoat Paint Systems of the Invention

The substrates to which the multicoat paint system of the invention is applied may be constructed from any of a very wide variety of materials and combinations of materials. They consist preferably of metals, plastics, glass, wood, leather, textile, ceramic or natural stone, preferably of metals, plastics and glass, more particularly of metals and plastics.

The multicoat paint system of the invention is especially advantageous in the context of substrates having a rough surface.

The coating material compositions (BL1), optionally (BL2), and (KL) used in accordance with the invention may be applied by any customary application techniques, such as spraying, knifecoating, spreading, casting, dipping, impregnating, trickling, or rolling, for example. At the time of such application, the substrate to be coated may itself be at rest, with the application equipment or unit being moved. Alternatively, it is also possible for the substrate that is to be coated to be moved, more particularly when it is a coil, with the application unit being at rest relative to the substrate or being moved appropriately.

Preference is given to using spray application methods, such as, for example, pneumatic spray application, airless spraying, electrostatic spray application (ESTA), preferably with high-speed rotating bells, and optionally in conjunction with hot spray application, such as hot air spraying, for example; more particularly pneumatic spray application or electrostatic spray application (ESTA), preferably with high-speed rotating bells.

The applied basecoat coating composition or compositions is or are preferably first dried—that is, in an evaporation phase, at least part of the organic solvent and/or of the water is removed from the basecoat film. Drying takes place preferably at temperatures from room temperature to 80° C. After drying has taken place, the transparent coating material composition is applied.

Curing of the applied coating material compositions may take place after a certain rest time. The rest time serves, for example, for the flow and degassing of the coating films or for the evaporation of volatile constituents such as solvents. The rest time may be shortened and/or assisted through the application of elevated temperatures and/or through a reduced atmospheric humidity, provided this does not entail any damage to or change in the coating films, such as premature complete crosslinking, for instance.

Thereafter the paint system is baked, preferably under conditions employed in the context of automotive OEM finishing, at temperatures of 20 to 200° C., preferably 40 to 190° C. and more particularly 50 to 180° C., for a time of 1 min up to 10 h, preferably 2 min to 5 h, and more particularly 3 min to 3 h; in the case of the temperatures employed for automotive refinishing and for the painting of plastics parts, and also for the painting of utility vehicles, these temperatures being generally between 20 and 80° C., more particularly between 20 and 60° C., it is also possible for longer cure times to be employed.

There are no peculiarities to the method of thermal curing of the coating material compositions, which instead takes place in accordance with the customary and known methods such as heating in a forced-air oven or irradiation with IR lamps. The thermal cure here may also take place in stages. Another preferred curing method is that of curing using near infrared (NIR) radiation.

The basecoat coating composition (BL1) and the basecoat coating composition (BL2), where present, are preferably applied in a wet film thickness such that curing results in a joint dry film thickness (referred to as process film thickness) of basecoat (BL1) and optionally basecoat (BL2) of 15 to 50 μm in total. As is known, the joint dry film thickness may of course differ significantly in the taper zones or in zones that are difficult to access.

The transparent coating material composition (KL) is preferably applied with a wet film thickness such that curing results in a dry clearcoat (KL) film thickness of 20 to 50 μm.

The multicoat paint systems of the invention are outstandingly suitable for use as decorative, protective and/or effect coatings and paint systems on bodies of means of transport (more particularly powered vehicles, such as cycles, motorcycles, buses, trucks or automobiles) or of parts thereof, more particularly for bodies of top-class automobiles, such as, for example, for the production of roofs, tailgates, engine cowlings, fenders, bumpers, spoilers, sills, protective strips, side trim, and so on, and for the painting of utility vehicles, such as of trucks, chain-driven construction vehicles, such as crane vehicles, wheel loaders and concrete mixers, buses, rail vehicles, watercraft, aircraft, and also agricultural equipment such as tractors and combines, and parts thereof, and also in automotive refinishing; automotive refinishing here encompasses not only the repair of the OEM finish on line but also the repair of local defects, such as scratches, stone-chip damage, and the like, and also the complete refinishing in corresponding repair shops and automobile painting facilities for adding value to vehicles; for the coating of the interior and exterior of edifices; of furniture, windows and doors; of plastics moldings, more particularly CDs and windows; of small industrial parts, of coils, containers and packaging; of white goods; of films; of optical, electrical and mechanical components; and also of hollow glassware and articles of everyday use.

The multicoat paint systems of the invention are employed preferably in automotive production-line (OEM) finishing, for automotive refinishing and/or for the coating of parts for installation in or on automobiles and/or for the coating of utility vehicles and/or for the coating of plastics parts.

The plastics parts consist typically of ASA, polycarbonates, blends of ASA and polycarbonates, polypropylene, polymethyl methacrylates or impact-modified polymethyl methacrylates, more particularly of blends of ASA and polycarbonates, used preferably with a polycarbonate fraction >40%, more particularly >50%.

EXAMPLES

Preparation Example for the Curing System Used (B-1)

Degree of Silanization of Compound (B-1), Based on NCO Molar: 34 Mol %, Molar Ratio of Structural Units (I) to Structural Units (II)=50:50

A reaction vessel is charged with 33.5 parts by weight of trimerized hexamethylene 1,6-diisocyanate (Desmodur® N3300, Bayer Material Science AG, Leverkusen) and 28 parts by weight of butyl acetate. With reflux cooling, nitrogen blanketing and stirring, a mixture of 7.0 parts by weight of N-[3-(trimethoxysilyl)propyl]butylamine (Dynasylan® 1189, EVONIK, Rheinfelden) and 10.0 parts by weight of bis[3-(trimethoxysilyl)propyl]amine (Dynasylan® 1124, EVONIK, Rheinfelden) is added dropwise at a rate such that the temperature does not exceed 50-60° C. The reaction mixture is stirred until the NCO value determined by titration has attained the theoretically calculated NCO value of 6.1 wt %. The resulting mixture has a theoretical solids content of 64 wt %.

Preparation Example for the Curing System Used (B-2)

Molar Ratio of Structural Units (I) to Structural Units (II) in the Compound (B2-2)=50:50, a Degree of Silanization of Compound (B2-2) of 41 Mol %, Corresponding to a Degree of Silanization, Based on the Isocyanate Groups Originally Present in the Compound (B1-2) Plus the Compound (B2-2), of 34 Mol %, and a Binder Fraction of the Polyisocyanate Parent Structure of Component (B1-2) of 20 wt %, Based on the Sum of the Binder Fraction of the Polyisocyanate Parent Structure of Component (B1-2) and the Binder Fraction of the Polyisocyanate Parent Structure of Component (B2-2)

A reaction vessel is charged with 28 parts by weight of trimerized hexamethylene 1,6-diisocyanate (Desmodur® N3300, Bayer Material Science AG, Leverkusen) and 24 parts by weight of butyl acetate. With reflux cooling, nitrogen blanketing and stirring, a mixture of 7.0 parts by weight of N-[3-(trimethoxysilyl)propyl]butylamine (Dynasylan® 1189, EVONIK, Rheinfelden) and 10.0 parts by weight of bis[3-(trimethoxysilyl)propyl]amine (Dynasylan® 1124, EVONIK, Rheinfelden) is added dropwise at a rate such that the temperature does not exceed 50-60° C. The reaction mixture is stirred until the NCO value determined by titration has attained the theoretically calculated NCO value of 5.2 wt %. Then 10 parts by weight of trimerized isophorone diisocyanate (Desmodur® Z4470, Bayer Material Science AG, Leverkusen, 70% in solvent naphtha) are added. The resulting mixture has an NCO value of 6.1 wt %. The resulting mixture has a theoretical solids content of 65 wt %.

Preparation Example for Polymethacrylate (A1)

In a double-walled 4 l stainless steel vessel, heatable by means of an oil circulation thermostat and equipped with thermometer, anchor stirrer, two dropping funnels and reflux condenser, solvent for the polymerization is introduced. One of the dropping funnels is charged with the monomer mixture, the second dropping funnel with the initiator solution, comprising a suitable initiator (generally a peroxide). The initial charge is heated to a polymerization temperature of 140° C. When the polymerization temperature has been attained, first of all the initiator feed is commenced. 15 minutes after the start of the initiator feed, the monomer feed (duration 240 minutes) is commenced. The initiator feed is set to continue for 30 minutes after the end of the monomer feed. After the end of the initiator feed, the mixture is stirred at 140° C. for a further 2 hours and then cooled to room temperature. The reaction mixture is subsequently adjusted with solvent to the solids content indicated in table 1.

TABLE 1

Composition of polymethacrylate (A1) in parts by weight and characteristics of polymethacrylate (A1) (acid number determined experimentally, OHN calculated theoretically, Tg calculated theoretically)

| Component | Parts by weight |
| --- | --- |
| Styrene | 8.0 |
| n-butyl methacrylate | 8.0 |
| Acrylic acid | 0.6 |
| 4-Hydroxybutyl acrylate | 12.0 |
| 2-Hydroxyethyl acrylate | 12.0 |
| n-Butyl acrylate | 19.0 |
| Solids 1 h 150° C. | 65% |
| Acid number (measured) [mg KOH/g] | 8-12 |
| OH number calculated [mg KOH/g] | 175 |
| Tg (FOX) [° C.] | −27 |

Preparation of the Inventive Rheological Assistant (R1) Based on Hydrophilic Silicas The first two items in table 2 (binder (A1) and solvent) are added to a dissolver in the order stated. The last item (Aerosil® 380, commercial rheological assistant based on hydrophilic fumed silica from Evonik Degussa, having an average primary particle size of 7 nm, a BET surface area as per DIN 66131 of 380 m²/g, and an $SiO_2$ content >99.8%, based on the substance calcined at 1000° C. for 2 hours) is added under maximum shearing. This is followed by dispersing for 30 minutes. The milled material is then dispersed further in an agitator mill using grinding media of 0.06-0.08 mm and with an energy input of 0.14-0.18 kWh per kg. The temperature of the grinding charge here is not to exceed 65° C.

TABLE 2

Composition of rheological assistant (R1) based on hydrophilic silicas

| Item | Component | Parts by weight |
| --- | --- | --- |
| 1 | Polyacrylate (A1) | 75 |
| 2 | Butyl acetate | 15 |
| 3 | AEROSIL ® 380 | 10 |

Preparation of the Inventive Rheological Assistant (R2) Based on Hydrophobic Silicas The first three items in table 3 (binder (A1) and solvent) are added to a dissolver in the order stated. The last item (Aerosil® R812, commercial rheological assistant based on hydrophobic fumed silica from Evonik Degussa, having an average primary particle size of 7 nm, a BET surface area as per DIN 66131 of 260 m²/g, and an $SiO_2$ content >99.8%, based on the substance calcined at 1000° C. for 2 hours) is added under maximum shearing. This is followed by dispersing for 30 minutes. The milled material is then dispersed further in an agitator mill using grinding media of 0.06-0.08 mm and with an energy input of 0.14-0.18 kWh per kg. The temperature of the grinding charge here is not to exceed 65° C.

TABLE 3

Composition of rheological assistant (R2) based on hydrophobic silicas

| Item | Component | Parts by weight |
| --- | --- | --- |
| 1 | Polyacrylate (A1) | 45 |
| 2 | Butyl acetate | 20 |
| 3 | Butanol | 25 |
| 4 | AEROSIL ® R812 | 10 |

Formulation of the Transparent Coating Material Compositions of Inventive Examples 1 to 4 and the Transparent Coating Material Compositions of Comparative Examples C1 to C2, and of the Corresponding Coatings of Examples 1 to 4 and of Comparative Examples C1 and C2

For preparing the millbases (S1) and (S2) of the inventive examples and the millbase (CS3) of the comparative examples, the constituents indicated in table 4 are weighed out in the stated order (beginning from the top) into a suitable vessel, in that order, and are stirred intimately together with one another.

TABLE 4

Composition of the millbase in parts by weight

| Item | Component | Parts by weight millbase (S1) | Parts by weight millbase (S2) | Parts by weight millbase (CS3) |
| --- | --- | --- | --- | --- |
| 1 | Polyacrylate (A1) | 60 | 60 | 60 |
| 2a1 | Hydrophilic rheological assistant (R1) | 15 | | |
| 2a2 | Hydrophobic rheological assistant (R2) | | 15 | |
| 2' | Rheological agent Setalux 91756 [1)*] | | | 15 |
| 3 | TINUVIN ® 384 [2)] | 1.5 | 1.5 | 1.5 |
| 4 | TINUVIN ® 292 [3)] | 1.5 | 1.5 | 1.5 |
| 5 | BYK ® 325 [4)] | 0.2 | 0.2 | 0.2 |
| 6 | Butyl acetate | 23 | 23 | 23 |
| 7 | Nacure ® 4167 [5)] | 2.3 | 2.3 | 2.3 |

Key to table 4:
[1)] Setalux ® 91756 = commercial rheological agent from Nuplex Resins, The Netherlands, urea-based, in solution or dispersion in a polyacrylate binder, with a nonvolatiles content of 60% by weight.
[2)] Tinuvin ® 384 = commercial light stabilizer based on a benzotriazole from BASF S.E.
[3)] Tinuvin ® 292 = commercial light stabilizer based on a sterically hindered amine from BASF S.E.
[4)] Byk ® 325 = commercial, polyether-modified polymethylalkylsiloxane from Byk Chemie
[5)] Nacure ® 4167 = commercial catalyst based on amine-blocked phosphoric acid partial ester, from King Industries, nonvolatiles content 25%

TABLE 5

Composition of the coating material compositions of examples 1 to 4 and of comparative examples C1 and C2

| | Example 1 | Example 2 | Example 3 | Example 4 | Comparative C1 | Comparative C2 |
| --- | --- | --- | --- | --- | --- | --- |
| Millbase (S1) | 100 | 100 | — | — | — | — |
| Millbase (S2) | — | — | 100 | 100 | — | — |
| Millbase (S3) | — | — | — | — | 100 | 100 |

TABLE 5-continued

Composition of the coating material compositions of
examples 1 to 4 and of comparative examples C1 and C2

|  | Example 1 | Example 2 | Example 3 | Example 4 | Comparative C1 | Comparative C2 |
|---|---|---|---|---|---|---|
| Curing agent B-1 | 100 | — | 100 | — | 100 | — |
| Curing agent B-2 | — | 100 | — | 100 | — | 100 |

Application of the Coating Material Compositions of Examples 1 to 4 and of Comparative Examples C1 and C2

The coating material compositions of examples 1 to 4 and of comparative examples C1 and C2 are prepared by weighing out the constituents indicated in table 5 in the order indicated (beginning from the top) into a suitable vessel, in that order, and combining them intimately by stirring. A steel substrate (bonder panel) was provided with a customary and known, cathodically deposited and baked electrocoat (dry film thickness of 20 μm). The bonder panels were measured, before being coated with the basecoat 1, using a commercial Perthometer, and a determination was made of the Ra value. Application takes place in one place to "rough" quality, with an Ra value of 0.5-0.6 (Cathoguard 350 from BASF Coatings GmbH), and once onto "smooth" quality (Cathoguard 500 from BASF Coatings GmbH) with an Ra value of 0.2-0.3.

Atop the resultant electrocoat, the commercial black aqueous basecoat 1 (ColorPrime 1 from BASF Coatings GmbH) was applied with a dry film thickness of 10 to 20 μm, flashed at room temperature for 2 minutes, and overcoated with a second application of the commercial black aqueous basecoat 2 (ColorPrime 2 from BASF Coatings GmbH) with a dry film thickness of 10 to 30 μm (the sum of both basecoat films 1+2 is 30 μm), then dried initially at 80° C. for 10 minutes, and cooled. Lastly, the coating material compositions of examples 1 to 4 and of comparative examples C1 and C2 in each case are applied using a gravity-feed cup gun, and the panels are baked vertically at 140° C. for 20 minutes. The clearcoat film thickness is 40 μm.

The gloss is subsequently determined using the micro-haze plus gloss meter from Byk. Following 2-hour storage at ambient temperature, polishability is determined by placement of a sanding mark on the cured clearcoat panel (using an eccentric compressed-air oscillating sander from 3M, 10 000 rpm, sanding pad: 3M Trizact 3000 grade). This sanding mark is subsequently polished using polishing paste (rotary polishing process, lambswool pad, Menzerna Nanopoliercreme PO 106 FA polishing paste). This is followed by determination of haze and gloss using the micro-haze plus, gloss meter from Byk.

Likewise determined is the blushing. For this purpose, the panels are stored for 10 days in a condensation chamber (in analogy to DIN EN ISO 6270-2 Sept05). Subsequently (after 24 hours), a colorimetric measurement is carried out using the X-Rite MA 68 II colorimeter. The test results of the stated investigations are reported in each case in table 6. Likewise tested was the windshield window bonding.

Discussion of the Test Results

The coatings of comparative examples C1 and C2, based on clearcoat materials with a urea-based rheological assistant, consistently exhibit significantly higher shortwave values for a clearcoat film thickness of 40 μm than the inventive coatings, based on clearcoat materials with an Aerosil®-based rheological assistant. On bonder panels which have been coated with a "rough quality" cured electrocoat, this difference is manifested to a somewhat more marked extent than on bonder panels which have been coated with a "smooth quality" cured electrocoat.

Conversely, the inventive coatings of examples 1 to 4, based on clearcoat materials with a fumed silica-based rheological assistant, exhibit very significantly improved shortwave values at a clearcoat film thickness of 40 μm, irrespective of whether the rheological assistant used was a hydrophilically modified fumed silica ("Aerosil® 380", rheological assistant (R1), examples 1a, 1b, 2a and 2b) or a hydrophobically modified fumed silica ("Aerosil® R812", rheological assistant (R2), examples 3a, 3b, 4a and 4b).

Particularly notable and particularly important for the "surfacer-less" multicoat paint systems of the invention is the use of clearcoat materials with a fumed silica-based rheological assistant, in contrast to the use of clearcoat materials with a urea-based rheological assistant, resulting in a greatly reduced tendency toward blushing. Accordingly, after measurement, the dL* value for all of the systems with Aerosil paste clearcoats is less than 1.0, whereas the value when using clearcoats with exclusively urea-based rheological assistants is very much higher.

The comparison of inventive examples 1a and 1b with the corresponding inventive examples 2a and 2b, and also the comparison of inventive examples 3a and 3b with the corresponding inventive examples 4a and 4b, illustrates in turn how the use of a curing agent mixture with an aliphatic isocyanate parent structure and with a cycloaliphatic isocyanate parent structure significantly enhances the polishability of the resultant coatings, irrespective of the particular rheological assistant used.

In addition, the coatings of the invention are notable for very good window bonding, even in the case of overbaked systems.

TABLE 6

Results of the testing of optical properties and the polishability of the coatings

|  | Example 1a | Example 2a | Example 1b | Example 2b | Example 3a | Example 4a | Example 3b | Example 4b | Comparative C1a | Comparative C2a | Comparative C1b | Comparative C2b |
|---|---|---|---|---|---|---|---|---|---|---|---|---|
| Ra/[μm] (bonder panel) | 0.5-0.6 | 0.5-0.6 | 0.2-0.3 | 0.2-0.3 | 0.5-0.6 | 0.5-0.6 | 0.2-0.3 | 0.2-0.3 | 0.5-0.6 | 0.5-0.6 | 0.2-0.3 | 0.2-0.3 |
| SW (vertical@40 μm) | 30-35 | 30-35 | 20-25 | 20-25 | 30-35 | 30-35 | 20-25 | 20-25 | 40-45 | 40-45 | 30-35 | 30-35 |
| LW (vertical@40 μm) | 8-12 | 8-12 | 8-12 | 8-12 | 8-12 | 8-12 | 8-12 | 8-12 | 8-12 | 8-12 | 8-12 | 8-12 |

TABLE 6-continued

Results of the testing of optical properties and the polishability of the coatings

| | Example 1a | Example 2a | Example 1b | Example 2b | Example 3a | Example 4a | Example 3b | Example 4b | Comparative C1a | Comparative C2a | Comparative C1b | Comparative C2b |
|---|---|---|---|---|---|---|---|---|---|---|---|---|
| Gloss | >85 E | >85 E | >85 E | >85 E | >85 E | >85 E | >85 E | >85 E | >85 E | >85 E | >85 E | >85 E |
| Gloss after 9 s polishing of a matt-sanded surface | 60-65 | 75-85 | 60-65 | 75-85 | 60-65 | 75-85 | 60-65 | 75-85 | 60-65 | 75-85 | 60-65 | 75-85 |
| dL* (45°) after 240 h condensation conditions | <1.0 | <1.0 | <1.0 | <1.0 | <1.0 | <1.0 | <1.0 | <1.0 | 3.5 | 4.0 | 2.8 | 3.5 |

The invention claimed is:

1. A surfacer-less multicoat effect and/or color paint system produced by
   (I) first applying a primer coating composition (G) to a substrate and optionally curing it,
   (II) applying a first pigmented basecoat coating composition (BL1) to the primer obtained in stage (I),
   (III) optionally applying a second pigmented basecoat coating composition (BL2) to the first basecoat film, obtained in stage (II),
   (IV) applying a transparent coating material composition (KL) based on at least one polyhydroxyl group-containing compound (A) and at least one polyisocyanate group-containing component (B) to the first basecoat film, obtained in stage (II), or if a second basecoat coating composition (BL2) has been applied to the second basecoat film, obtained in stage (III), and
   (V) jointly curing the first basecoat film, the second basecoat film, where present, and the transparent coating film,
   wherein
   the transparent coating material composition (KL) comprises
      (i) at least one rheological assistant (R) based on fumed silica and
      (ii) at least one polyisocyanate group-containing component (B) which has at least one structural unit of the formula (I)

—NR—(X—SiR''$_x$(OR')$_{3-x}$)    (I), and at least one structural unit of the formula (II)

—N(X—SiR''$_x$(OR')$_{3-x}$)$_n$(X'—SiR''$_y$(OR')$_{3-y}$)$_m$    (II), where
      R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
      R'=hydrogen, alkyl or cycloalkyl, it being possible for the carbon chain to be interrupted by nonadjacent oxygen, sulfur or NRa groups,
      X,X'=linear and/or branched alkylene or cycloalkylene radical having 1 to 20 carbon atoms,
      R''=alkyl, cycloalkyl, aryl or aralkyl, it being possible for the carbon chain to be interrupted by nonadjacent oxygen, sulfur or NRa groups,
      n=0 to 2, m=0 to 2, m+n=2, and x, y=0 to 2;
   wherein the at least one polyisocyanate group-containing component (B) comprises a mixture of
   (B1) at least one polyisocyanate group-containing compound (B1) having free or blocked isocyanate groups and having a cycloaliphatic polyisocyanate parent structure and/or a polyisocyanate parent structure having free or blocked isocyanate groups that is derived from such a cycloaliphatic polyisocyanate by trimerization, dimerization, urethane formation, biuret formation, uretdione formation and/or allophanate formation, and
   (B2) at least one polyisocyanate group-containing compound (B2) different from compound (B1) and having free or blocked isocyanate groups and having an acyclic, aliphatic polyisocyanate parent structure and/or a polyisocyanate parent structure having free or blocked isocyanate groups that is derived from such an acyclic aliphatic polyisocyanate by trimerization, dimerization, urethane formation, biuret formation, uretdione formation and/or allophanate formation,
   and compound (B1) and/or compound (B2) have at least one structural unit of the formula (I) and/or at least one structural unit of the formula (II) such that the mixture of compounds (B1) plus (B2) has not only structural units (I) but also structural units (II), and
   wherein compound (B1) is used in an amount such that a binder fraction of the isocyanate group-containing parent structure of compound (B1) based on solids content is between 5 and 45 wt % based on the sum of the binder fraction of the isocyanate group-containing parent structure of compound (B1) based on solids content plus a binder fraction of the isocyanate group-containing parent structure of compound (B2) based on solids content.

2. The multicoat effect and/or color paint system of claim 1, wherein the transparent coating material composition (KL) contains the rheological assistant (R) in a total amount of 0.01 to 10 wt %, based on a binder fraction based on solids content of the transparent coating material composition.

3. The multicoat effect and/or color paint system of claim 1, wherein the rheological assistant (R) has a primary particle size of <50 nm.

4. The multicoat effect and/or color paint system of claim 1, wherein the rheological assistant (R) comprises at least one rheological assistant (R1) based on hydrophilic silicas or at least one rheological assistant (R2) based on hydrophobic silicas, or a mixture of at least one rheological assistant (R1) based on hydrophilic silicas and at least one rheological assistant (R2) based on hydrophobic silicas.

5. The multicoat effect and/or color paint system of claim 1, wherein in the polyisocyanate group-containing component (B) between 10 and 80 mol % of the isocyanate groups originally present in the polyisocyanate group-containing component (B) have undergone reaction to form structural units (I) and/or (II).

6. The multicoat effect and/or color paint system of claim 1, wherein in the polyisocyanate group-containing component (B) the total amount of structural units (I) is between 3 and 90 mol % and the total amount of structural units (II) is between 97 and 10 mol %, based on the total amount of (I) and (II).

7. The multicoat effect and/or color paint system of claim 1, wherein the polyisocyanate parent structure of compound (B1) is isophorone diisocyanate and/or 4,4'-methylenedicyclohexyl diisocyanate and/or the isocyanurate trimer thereof and/or the allophanate dimer thereof and/or the biuret dimer thereof, and/or the polyisocyanate parent structure of compound (B2) is 1,6-hexamethylene diisocyanate and/or the isocyanurate trimer thereof and/or the allophanate dimer thereof and/or the biuret dimer thereof.

8. The multicoat effect and/or color paint of claim 1, wherein in the mixture of polyisocyanate compound (B1) plus polyisocyanate compound (B2) between 10 and 80 mol % of the isocyanate groups originally present in (B1) plus (B2) have undergone reaction to form structural units (I) and (II).

9. A surfacer-less method for producing multicoat color and/or effect paint systems of claim 1, comprising:
(I) applying a primer coating composition (G) to a substrate and optionally curing,
(II) applying a first pigmented basecoat coating composition (BL1) to the primer obtained in stage (I),
(III) optionally applying a second pigmented basecoat coating composition (BL2) to the first basecoat film, obtained in stage (II),
(IV) applying a transparent coating material composition (KL) to the first basecoat film, obtained in stage (II), or—if a second basecoat coating composition (BL2) has been applied—to the second basecoat film, obtained in stage (III), and
(V) jointly curing the first basecoat film, the second basecoat film, where present, and the transparent coating film.

10. The method of claim 9, wherein the coating material compositions (BL1), (BL2) and (KL) are applied by means of pneumatic spray application or of electrostatic spray application (ESTA).

11. The method of claim 9, wherein the thickness of a dry film of the basecoat coating composition (BL1) and optionally the basecoat coating composition (BL2) is 15 to 40 μm in total, and/or the of a dry film of the clearcoat material (KL) is 20 to 50 μm.

12. The method of claim 9, wherein the basecoat coating composition (BL1) and the optionally applied basecoat coating composition (BL2) are aqueous coating material compositions.

13. The method of claim 9, wherein the substrate consists of metal and/or plastic.

14. The method of claim 9, wherein the primer coating composition (G) is cured after application to the substrate.

15. The method of claim 9, wherein the second pigmented basecoat coating composition (BL2) is applied to the first basecoat film, obtained in stage (II).

16. A surfacer-less method of using the multicoat paint system of claim 1 comprising applying the multicoat paint system in automotive OEM finish, automotive refinish, coating of parts for installation in or on motor vehicles, coating of utility vehicles and/or coating of plastics parts.

17. The surfacer-less multicoat effect and/or color paint system of claim 1, wherein compound (B1) is used in an amount such that the binder fraction of the isocyanate group-containing parent structure of compound (B1) based on solids content is between 15 and 35 wt % based on the sum of the binder fraction of the isocyanate group-containing parent structure of compound (B1) based on solids content plus the binder fraction of the isocyanate group-containing parent structure of compound (B2) based on solids content.

* * * * *